US012141036B2

(12) United States Patent
Natanzon

(10) Patent No.: US 12,141,036 B2
(45) Date of Patent: Nov. 12, 2024

(54) DATA BACKUP SYSTEM AND METHOD IN FIXED SIZE DEDUPLICATION SYSTEMS

(71) Applicant: Huawei Technologies Co., Ltd., Shenzhen (CN)

(72) Inventor: Assaf Natanzon, Hod Hasharon (IL)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/188,711

(22) Filed: Mar. 23, 2023

(65) Prior Publication Data
US 2023/0244571 A1 Aug. 3, 2023

Related U.S. Application Data

(63) Continuation of application No. PCT/EP2020/076706, filed on Sep. 24, 2020.

(51) Int. Cl.
G06F 16/00 (2019.01)
G06F 11/14 (2006.01)

(52) U.S. Cl.
CPC ...... G06F 11/1453 (2013.01); G06F 2201/84 (2013.01)

(58) Field of Classification Search
CPC ............ G06F 11/1453; G06F 2201/84; G06F 3/0608; G06F 3/0641; G06F 3/0644; G06F 3/0656; G06F 3/0679; G06F 16/1748
See application file for complete search history.

(56) References Cited

U.S. PATENT DOCUMENTS

2020/0034452 A1* 1/2020 Schneider ........... G06F 16/1748

OTHER PUBLICATIONS

Sonam Mandal et al: "Using Hints to Improve Inline Block-Layer Deduplication," USENIX, the Advanced Computing Systems Association, Feb. 22, 2016, XP061024909, 8 pages.

* cited by examiner

Primary Examiner — Tyler J Torgrimson
(74) Attorney, Agent, or Firm — Conley Rose, P.C.

(57) ABSTRACT

A computer-implemented data backup method comprises storing metadata associated with an object in a secondary storage layer of a backup system, the metadata representing a data structure for the object, dividing a set of data representing the object into multiple variable length chunks, determining whether an existing chunk of data that is the same as at least a part of the variable length chunk exists in a primary storage layer of the backup system, storing the variable length chunk in the primary storage layer of the backup system, and on the basis of the determination, providing the primary storage layer of the backup system with an indication of the location of the existing chunk of data.

20 Claims, 3 Drawing Sheets

DATA BACKUP SYSTEM AND METHOD IN FIXED SIZE DEDUPLICATION SYSTEMS

CROSS-REFERENCE TO RELATED APPLICATIONS

This application is a continuation application of International Patent Application No. PCT/EP2020/076706 filed on Sep. 24, 2020, which is hereby incorporated by reference in its entirety.

TECHNICAL FIELD

Aspects relate, in general, to data backup and more specifically, although not exclusively to a data backup system and method for optimization of differential compression in fixed size deduplication systems.

BACKGROUND

Deduplicated data systems are often able to reduce the amount of space required to store data by recognizing redundant data patterns. For example, a deduplicated data system may reduce the amount of space required to store similar files by dividing the files into chunks and storing only unique chunks. As such, a deduplicated file may consist of a list of chunks that make up the file.

Some systems divide data into fixed-width chunks. Unfortunately, this approach may result in large amounts of identical information that will not be deduplicated. For example, a long sequence of data in one file may begin at a fixed-width chunk boundary of the file, while the same long sequence of data may begin in the middle of a fixed-width chunk of another file, resulting in no identical fixed-width chunks that may be deduplicated between the two files.

In order to facilitate the deduplication of identical sequences of data at arbitrary offsets within files, some traditional deduplicated data systems may divide files into variable-width chunks. This often requires an undesirable amount of overhead to maintain metadata relating to the deduplicated data.

To overcome some of these issues, similarity (or differential) compression algorithms can be implemented in which similarity hash functions are applied to data blocks. A generated similarity hash for a block can be compared to that of stored parent blocks to determine a degree of similarity between the blocks. Thus, for each block, if a similar block is found the system can keep the compressed difference between the two rather than storing the entire block again.

For example, the parent block can be compressed and for each new and similar block the compressed difference can be stored. Alternatively, multiple similar blocks can be compressed together resulting in higher compression ratios. However, this results in much larger decompression demands when retrieving a block. Furthermore, the amount of metadata required in differential compression implementations does not allow the system to keep the data structures associated with the process in memory and thus the system needs to first store the data and is only able to process the data and perform the differential decompression afterwards.

SUMMARY

According to a first aspect, there is provided a computer-implemented data backup method, the method comprising storing metadata associated with an object in a secondary storage layer of a backup system, the metadata representing a data structure for the object, dividing a set of data representing the object into multiple variable length chunks, determining whether an existing chunk of data that is the same as at least a part of the variable length chunk exists in a primary storage layer of the backup system, storing the variable length chunk in the primary storage layer of the backup system, and on the basis of the determination, providing the primary storage layer of the backup system with an indication of the location of the existing chunk of data.

Metadata representing the structure of the object is maintained in a secondary storage system whilst the object data itself is split into variable length chunks for storage at a primary storage system. A check is performed on the primary storage system to determine the presence (or not) of a variable length chunk—if such data is found, then the data is written as normal to the primary storage system but an indication as to the location of the existing data is also provided. In this way, the primary storage system may perform differential compression or deduplication of the variable length chunk (or the existing chunk data). Provision of the metadata associated with the object in the secondary storage layer enables the object to be restored or, e.g., accessed or mounted, directly from the primary storage without the need for recourse to a backup application since the variable length chunks are written to the primary storage in raw format as opposed to a proprietary deduplication format comprehensible only to a backup application.

In an implementation of the first aspect, the variable length chunk can be stored in the primary storage layer of the backup system in one or more fixed-size and aligned blocks, and the existing chunk of data can comprise one or more fixed-size and aligned blocks. The variable length chunk can be stored in the primary storage layer of the backup system in the form of differentials between fixed-size and aligned blocks.

For example, the variable length chunk of data can be split in multiple fixed-sized blocks for efficient storage on the primary storage layer of the backup system. Accordingly, efficient inline deduplication and differential compression may be performed, providing improved compression ratios and reduced computation.

In an implementation of the first aspect, the variable length chunk may be compressed at the primary storage layer of the backup system on the basis of the determination. Compressing the variable length chunk can comprise differentially compressing the difference between the variable length chunk and the existing chunk of data. A reference to the existing chunk of data for use by the secondary storage layer of a backup system can be generated, whereby to enable deduplication of the variable length chunk.

In the event that a variable length chunk of data is already provided in the primary storage, and according to the extent to which that existing data maps to the variable length chunk in terms of offset etc., the primary storage may be able to perform differential compression, or deduplication. A reference to the existing chunk can be provided at the location of the variable length chunk to enable direct access to the object from the primary storage.

According to a second aspect, there is provided a non-transitory machine-readable storage medium comprising machine-readable instructions which, when executed by a processor, cause the machine to execute a backup task to store metadata associated with an object in a secondary storage layer of a backup system, the metadata representing a data structure for the object, divide a set of data representing the object into multiple variable length chunks, determine whether an existing chunk of data that is the same as at least a part of a variable length chunk exists in a primary storage layer of the backup system, store the variable length chunk in the primary storage layer of the backup system, and on the basis of the determination, provide the primary storage layer of the backup system with an indication of the location of the existing chunk of data.

In an implementation of the second aspect, the non-transitory machine-readable storage medium can comprise further instructions to analyse the variable length chunk for duplicates at a time of writing it to the primary storage layer of the backup system. Further instruction can be provided to divide the variable length chunk into one or more fixed-size aligned blocks of data with a predetermined length. Further instruction can be provided to differentially compress the difference between the variable length chunk and the existing chunk of data, and store the result of the differential compression in a fixed-size aligned block in the primary storage layer of the backup system. Further instruction can be provided to generate a write command for the primary storage layer of the backup system including a logical unit and offset associated with the existing chunk of data.

According to a third aspect, there is provided a system for variable length deduplication, the system comprising a secondary storage layer to store metadata representing a data structure of an object to be backed-up, and a primary storage layer to store multiple fixed length aligned blocks of data representing a variable length chunk generated from the object to be backed-up. In the event that an existing chunk of data that is the same as at least a part of the variable length chunk exists in the primary storage layer, the primary storage layer can receive an indication of the location of the existing chunk of data, and perform deduplication of the variable length chunk or part of the variable length chunk. The primary storage layer can perform inline differential compression of data of a data stream representing the object to be backed up. The object can be restored, executed, mounted or exposed from the primary storage layer.

BRIEF DESCRIPTION OF DRAWINGS

For a more complete understanding of the present disclosure, reference is now made, by way of example only, to the following descriptions taken in conjunction with the accompanying drawings, in which.

DESCRIPTION OF EMBODIMENTS

Figure 1:
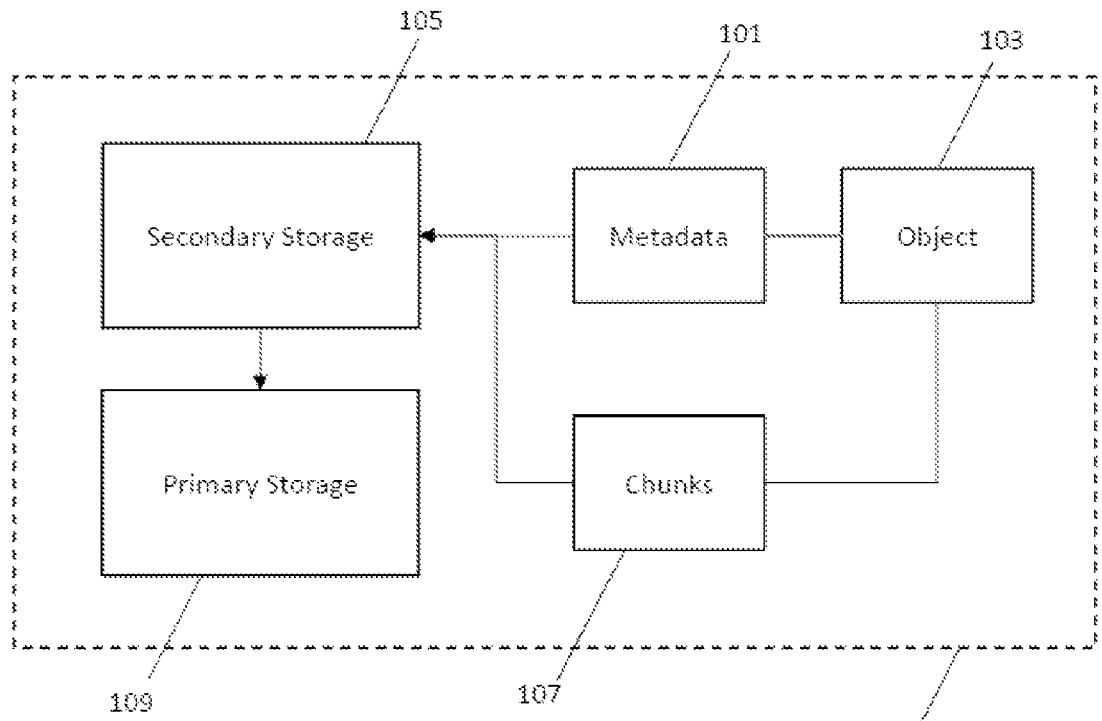
FIG. 1 is a schematic representation of a system implementing a data backup method according to an example.

Example embodiments are described below to enable those of ordinary skill in the art to embody and implement the systems and processes herein described. The embodiments can be provided in many alternate forms and should not be construed as limited to the examples set forth herein. Accordingly, while embodiments can be modified in various ways and take on various alternative forms, embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

In some backup systems, inline variable length deduplication can be performed in which data is chunked (or divided) into multiple variable size chunks. Data structures that enable checks to be performed to determine whether the data is already available are stored. If the data is available, it will not be stored again and other meta data will be stored. For example, in a set of data representing an object, repeated non-overlapping subparts (chunks) can be found and replaced with index values that are smaller in size than the original chunks.

However, an issue with such an approach is that the data is kept in a deduplication format in the storage and is therefore not optimized for retrieval, especially if lower layer storage of the system is also performing deduplication and compression (such as fixed-size de-duplication for example). Furthermore, the data cannot be read or mounted directly from the storage without appropriate backup software.

According to an example, a data backup method is provided in which metadata used by a variable length deduplication system can be stored. A backup application of the system can perform data chunking and determine the presence of similarities between chunks of data. However, instead of storing the data in a special or proprietary de-duplicated format for example, the data can be written to a, e.g., block storage layer in a standard (raw) format as if there was no backup application in operation. The backup system can provide an indication of the location of an existing chunk of data to the block storage layer, which can then use the indication provided to perform, e.g., differential compression (and possibly even deduplication if offsets are aligned). In an example, in effect, a hint is provided to the lower level storage, such as a primary storage layer of a backup system, which tells it that the data that was just written was already written in the system along with the location where the date was written.

FIG. 1 is a schematic representation of a system implementing a data backup method according to an example. Metadata 101 associated with an object 103 is stored in a secondary storage layer 105 of a backup system 100. In an example, the metadata 101 represents a data structure for the object 103. The metadata 101 can be in the form of a set of name-value pairs or can comprise information about data containers with indications as to how objects are structured (e.g., how values are ordered to form records). The metadata 101 can therefore describe the types, versions, relationships and other characteristics of data.

In an example, a set of data representing the object 103 is divided or chunked into multiple variable length chunks 107. For example, the set of data representing the object 103 may be split into variable length chunks, the size of which being defined by some internal features of the data. For example, a content-aware process may be used to divide the data into multiple variable length chunks. Alternatively, a content-agnostic method of chunking may be used.

The system 100 can determine whether an existing chunk of data that is the same as at least a part of another variable length chunk exists in a primary (e.g., block) storage layer 109 of the backup system 100. The variable length chunk 107 is stored in the primary storage layer of the backup system, and on the basis of the determination, the primary storage layer 109 of the backup system can be provided with an indication of the location of the existing chunk of data. For example, the system 100 implements a variable length deduplication solution for secondary storage (or backup software), that can leverage differential compression provided by lower level block storage 109. In an example, primary storage 109 can be block storage, which supports fixed-size de-duplication with differential compression. Metadata 101 for data stored in the primary storage layer 109 is provided in a secondary storage layer 105 that enables direct access to the data on the primary storage layer (e.g., such data can be mounted) without the need for an intermediate backup system (i.e. without the need for a system that works only on a proprietary form of data on the primary storage layer).

According to an example, a variable length chunk 107 is stored in the primary storage layer 109 of the backup system 100 in one or more fixed-size and aligned blocks. The start of the variable length chunk 107 does not necessarily start at a beginning of a fixed-size block and the end of the variable length chunk 107 does not necessarily end at the end of a fixed-sized block. For example, a variable length chunk may be stored as part of one or more fixed-size and aligned blocks, but there may be a trailer at the beginning of the first block and a trailer at the end of the last block that do not belong to the variable sized chunk. In the case that the variable length chunk is aligned there is no need for the delta compression. Similarly, an existing chunk of data, if present, can be stored in the form of one or more fixed-size and aligned blocks. In order to provide efficient inline deduplication and differential compression thereby providing improved compression ratios and reduced computation, the variable length chunk of data may be split in or across multiple fixed-sized blocks for efficient storage on the primary storage layer of the backup system where it may be stored in the form of differentials between fixed-size and aligned blocks. In an example, a variable length chunk may be compressed at the primary storage layer of the backup system on the basis of the determination. In an example, the variable length chunk can be compressed by differentially compressing the difference between the variable length chunk and the existing chunk of data.

Advantageously, a reference to the existing chunk of data can be generated and provided for use by the secondary storage layer of the backup system, whereby to enable deduplication of the variable length chunk. In an example, in the event that a variable length chunk of data is already provided in the primary storage, and according to the extent to which that existing data maps to the variable length chunk in terms of offset etc., the primary storage may be able to perform differential compression, or deduplication. A reference to the existing chunk can be provided at the location of the variable length chunk to enable direct access to the object from the primary storage.

Figure 2:
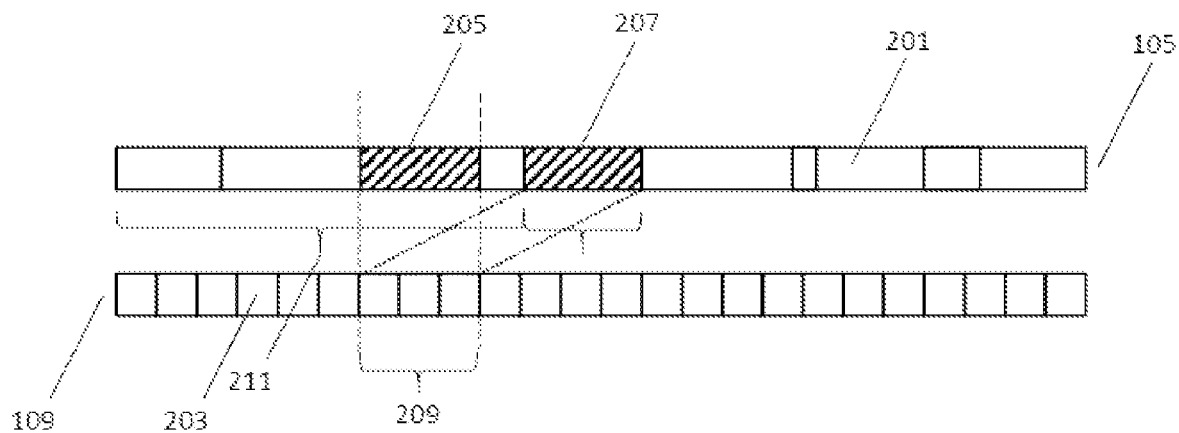
FIG. 2 is a schematic representation of a data backup method according to an example.

FIG. 2 is a schematic representation of a data backup method according to an example. An object 103 is split into multiple variable length chunks 201. Metadata associated with the object is stored in the secondary storage layer 105 of the backup system 100. As noted above, the metadata 101 represent a data structure for the object. Each variable length chunk 201 is stored in the secondary storage layer 105 of backup system 100. For example, the variable length chunks 107 may be stored and, in an example, deduplication may be performed on these chunks stored in the secondary storage layer.

Differential compression provided by the primary storage layer 109 of the backup system is leveraged. In the example of FIG. 2, each variable size chunk from the secondary storage layer is written to the primary storage layer 105 in a standard raw format (as if there was no backup application present) over fixed-size blocks 203. For example, the variable length chunks 211 are written to the primary storage layer in the form of multiple fixed-sized blocks 203. In the example of FIG. 2, two instances (205, 207) of the same variable sized chunk are present in the data to be backed up from the secondary storage layer. Accordingly, whilst both instances are stored in fixed-sized blocks 203 in the primary storage layer 109, a reference to or indication of the location or presence of the first instance (209) of chunk 205 is provided to the primary storage layer 109. The lower level (primary) storage layer may then use this information in order to perform differential compression, or deduplication in respect of the chunk 207. For example, the data to be backed up is stored as originally provided. Accordingly, if a logical unit is backed up at an offset 'x', it will also be stored at offset 'x'. In an example, variable sized chunks are stored according to the offset that they were originally written with, but, advantageously a 'hint' is provided to the primary storage layer (i.e., a reference to the existing chunk of data). The reference (or indication) enables the primary storage layer to determine that two variable sized chunks are identical but that they may be provided at different offsets. For example, one variable sized chunk may be aligned to an 8 kilobyte (KB) block and end at an offset of 5 KB to another 8 KB block. Or, for example, one variable sized chunk may start at an offset of 1 KB from the beginning of an 8 KB block and end at offset of 6 KB from of another 8 KB block.

According to an example, when writing data to the primary storage layer 109 from the secondary storage layer 105, a write command can be implemented in the form:

write(LUN,data,offset,length,otherLU,otherOffset), where 'LUN' is a logical unit number providing an identifier for a chunk of data to be written, 'data' is the data chunk to be written (i.e. a portion of data to be written, such as 205 for example), 'offset' provides data representing the position of the chunk relative to, e.g., a preceding chunk, and 'length' provides a measure of the length of the chunk in question. In the context of FIG. 2, for example, 'other LUN' and 'otherOffset' provide information relating to the location of the existing data. For example, the write command provides information to enable the chunk under consideration (e.g. chunk 207) to be validly written to the primary storage layer, whilst also providing information specifying the identification and location of existing data (e.g. chunk 205) in the primary storage layer that is the same as the chunk being written.

The data structure is provided in higher level (i.e. secondary storage layer) of the system and enables the system to perform inline differential compression. However, further advantageously, in terms of the lower layer (i.e. primary storage payer) of the system, inline deduplication and differential compression can be performed, thereby providing improved compression ratios, less computation and less write amplification (since the deduplication is inline. The data provided in the primary storage layer is maintained in a raw format, i.e., not in a format that is proprietary to a backup application for example. Whilst the same compression ratios are maintained, the beneficial effect of this is that data restoration can be performed without recourse to a backup application. For example, if the data in question if in the form of a virtual machine (VM), the VM can simply be executed directly from the primary storage.

Figure 3:
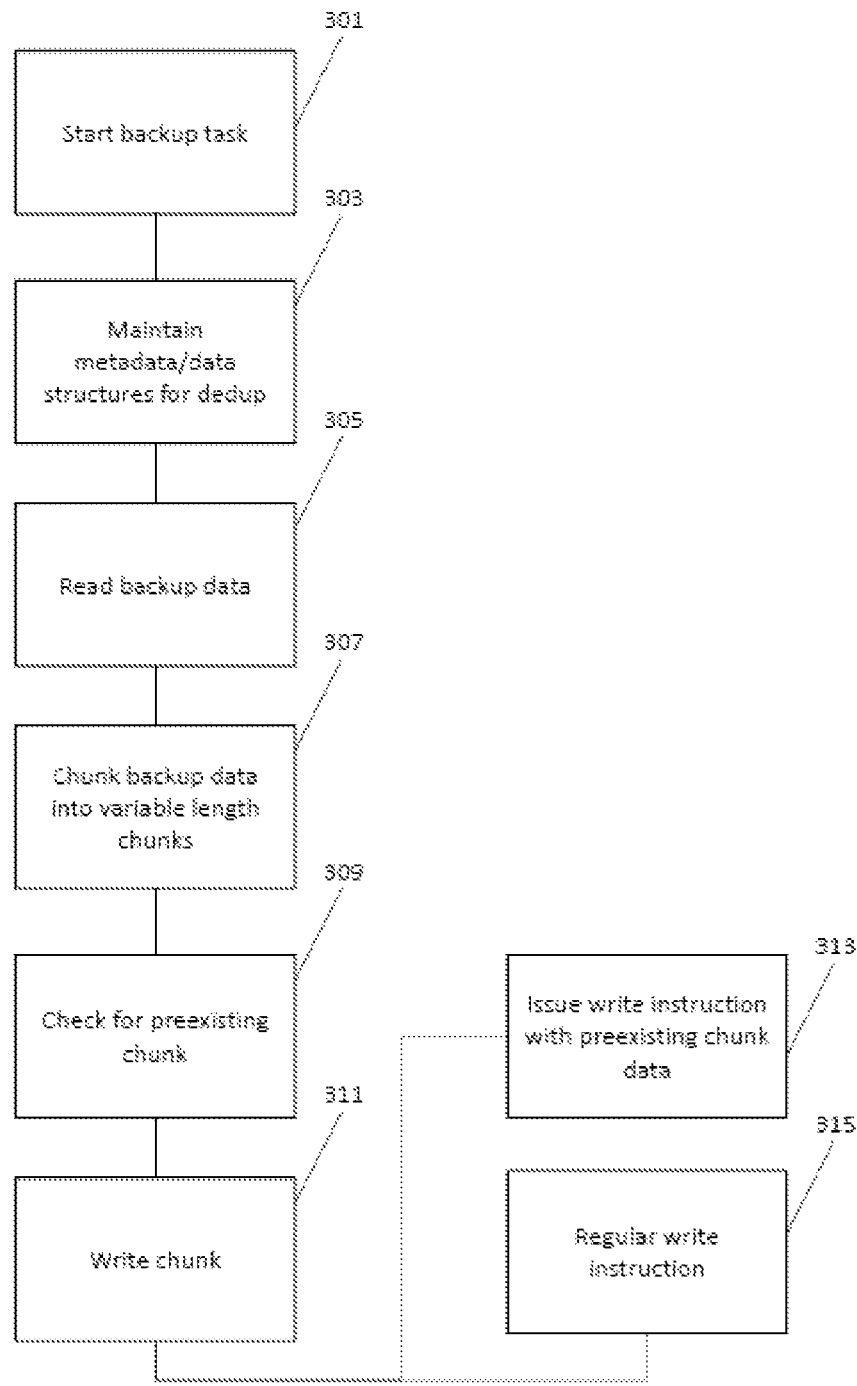
FIG. 3 is a flowchart of a data backup method according to an example.

FIG. 3 is a flowchart of a data backup method according to an example. In block 301 a backup task starts (e.g. backing up a VM). In block 303, a backup system maintains all the data structures required for deduplication of data to be backed up. In an example, the backup system can comprise a backup application that has access to the primary and secondary storage layers, such as that described with reference to FIG. 1 and FIG. 2.

In block 305, the backup application can read the backup data (i.e., data to be backed up) from an application host. In block 307, the backup data is chunked into variable length chunks. Any suitable chunking method can be used to generate variable length chunks from the data to be backed up. For example, as noted above, a content dependent variable chunking method can be used. In block 309, for each chunk, the backup application can check the stored metadata representing a data structure for the data backed up to determine whether a chunk of data with the same data already exists, i.e., whether a chunk comprising the same data as that currently under consideration has been backed up already. The comparison can be performed using, for example, a comparison of signatures generated from chunks of data using a hash signature mechanism such as, e.g., MD5, sha2, and so on.

In block 311, data read from the backup application, i.e. the chunk, is written with the same offset to a target storage system, which in the examples of FIG. 1 to FIG. 3 is the primary storage layer 109. For example, for example, if a VM file is backed up, the data will be written to a VM file of the same size in the backup and with the same offset that the original data was read. In block 313, if it determined that the chunk already exists (i.e., there is a chunk comprising the same data as that to be written) the backup application can issue a write (such as that described above) indicating where the identical data is suspected to already been written. Conversely, in block 315, if the chunk does not exist a regular write can be used.

In an example, on the primary storage layer, when a write arrives, if it has the same offset as suspected identical data, the storage system can perform differential compression of the new data written compared to the data that is written in the reference offset.

Examples in the present disclosure can be provided as methods, systems or machine-readable instructions, such as any combination of software, hardware, firmware or the like. Such machine-readable instructions may be included on a computer readable storage medium (including but not limited to disc storage, compact disk-read-only memory (CD-ROM), optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. In some examples, some blocks of the flow diagrams may not be necessary and/or additional blocks may be added. It shall be understood that each flow and/or block in the flow charts and/or block diagrams, as well as combinations of the flows and/or diagrams in the flow charts and/or block diagrams can be realized by machine readable instructions.

The machine-readable instructions may, for example, be executed by a general-purpose computer, a special purpose computer, an embedded processor or processors of other programmable data processing devices to realize the functions described in the description and diagrams. In particular, a processor or processing apparatus may execute the machine-readable instructions. In an example, modules of apparatus (for example, a module implementing a function to compare signatures associated with data chunks) may be implemented by a processor executing machine readable instructions stored in a memory, or a processor operating in accordance with instructions embedded in logic circuitry. The term 'processor' is to be interpreted broadly to include a central processing unit (CPU), a processing unit, application-specific integrated circuit (ASIC), logic unit, or programmable gate set etc. The methods and modules may all be performed by a single processor or divided amongst several processors.

Such machine-readable instructions may also be stored in a computer readable storage that can guide the computer or other programmable data processing devices to operate in a specific mode. For example, the instructions may be provided on a non-transitory computer readable storage medium encoded with instructions, executable by a processor.

Figure 4:
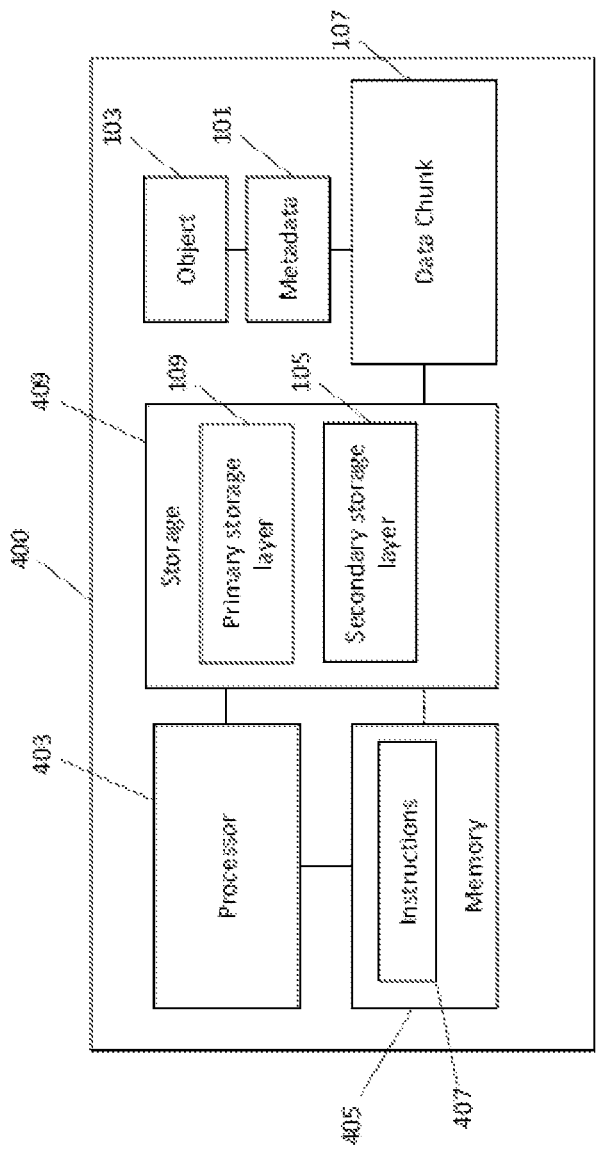
FIG. 4 is a schematic representation of a machine forming a data backup system according to an example.

FIG. 4 is a schematic representation of a machine forming a data backup system according to an example. System 400 comprises a processor 403 and a memory 405 storing instructions 407. A storage 409 can be provided. Storage 409 can comprise a primary storage layer 109 and a secondary storage layer 105. Alternatively, one, other or both of the primary and secondary storage layers can be provided on separate storage apparatus of the system 400.

The instructions 407 are executable by the processor 403. The instructions 407 can comprise instructions to cause the machine to execute a backup task. In an example, the instructions 407 can comprise instructions to store metadata associated with an object in a secondary storage layer of the backup system, the metadata representing a data structure for the object, divide a set of data representing the object into multiple variable length chunks, determine whether an existing chunk of data that is the same as at least a part of a variable length chunk exists in a primary storage layer of the backup system, store the variable length chunk in the primary storage layer of the backup system, and on the basis of the determination, provide the primary storage layer of the backup system with an indication of the location of the existing chunk of data.

Accordingly, the system 400 can implement a method for data backup. Such machine-readable instructions may also be loaded onto a computer or other programmable data processing devices, so that the computer or other programmable data processing devices perform a series of operations to produce computer-implemented processing, the instructions executed on the computer or other programmable devices provide an operation for realizing functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing device into a device for variable-length chunking for deduplication. As another example, one or more of the modules described herein may transform a volume of data into a volume of deduplicated variable-length data chunks.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

What is claimed is:

1. A computer-implemented data backup method, comprising:
   storing metadata associated with an object in a secondary storage layer of a backup system, wherein the metadata represents a data structure for the object;
   dividing a set of data representing the object into variable-length chunks;
   storing, in a primary storage layer of the backup system, a variable-length chunk of the variable-length chunks in a standard format for direct access when an existing chunk exists in the primary storage layer;
   providing the primary storage layer with an indication of a location of the existing chunk of data based on the existing chunk that exists in the primary storage layer;
   compressing the variable-length chunk in the primary storage layer based on the existing chunk that exists in the primary storage layer, wherein compressing the variable-length chunk comprises differentially compressing a difference between the variable length chunk and the existing chunk of data; and
   providing an application with the direct access to the set of data from the primary storage layer without using another system to provide the set of data to the application.

2. The computer-implemented data backup method of claim 1, further comprising further storing the variable-length chunk in the primary storage layer in at least one fixed-size and aligned block, wherein the existing chunk of data comprises at least one second fixed-size and aligned block.

3. The computer-implemented data backup method of claim 1, further comprising further storing the variable length chunk in the primary storage layer as a difference between at least one fixed-size and aligned block.

4. The method of claim 1, further comprising analyzing the variable-length chunk for duplicates at a time of writing the variable-length chunk to the primary storage layer of the backup system.

5. The method of claim 1, further comprising generating a write command for the primary storage layer of the backup system that includes a logical unit and an offset associated with the existing chunk of data.

6. The computer-implemented data backup method of claim 1, further comprising generating a reference to the existing chunk of data for the secondary storage layer of a backup system.

7. A computer program product comprising a non-transitory machine-readable storage medium storing computer-executable instructions and that, when executed by a processor, cause an apparatus to:
   store metadata associated with an object in a secondary storage layer of a backup system, wherein the metadata represents a data structure for the object;
   divide a set of data representing the object into multiple variable-length chunks;
   store, in a primary storage layer of the backup system, a variable-length chunk of the variable-length chunks in a standard format for direct access in the primary storage layer when an existing chunk exists in the primary storage layer;
   provide the primary storage layer with an indication of a location of the existing chunk of data based on the existing chunk that exists in the primary storage layer;
   compress the variable-length chunk in the primary storage layer based on the existing chunk that exists in the primary storage layer, wherein compressing the variable-length chunk comprises differentially compressing a difference between the variable length chunk and the existing chunk of data; and
   provide an application with the direct access to the set of data from the primary storage layer without using another system to provide the set of data to the application.

8. The computer program product of claim 7, wherein the computer-executable instructions further cause the apparatus to analyze the variable-length chunk for duplicates at a time of writing the variable-length chunk to the primary storage layer of the backup system.

9. The computer program product of claim 7, wherein the computer-executable instructions further cause the apparatus to divide the variable-length chunk into at least one fixed-size and aligned block of data with a predetermined length.

10. The computer program product of claim 7, wherein the computer-executable instructions further cause the apparatus to:
    obtain a result of differential compression based on differentially compressing the difference between the variable length chunk and the existing chunk; and
    store the result in a fixed-size and aligned block in the primary storage layer of the backup system.

11. The computer program product of claim 7, wherein the computer-executable instructions further cause the apparatus to generate a write command for the primary storage layer of the backup system that includes a logical unit and an offset associated with the existing chunk of data.

12. The computer program product of claim 7, wherein the computer-executable instructions further cause the apparatus to store the variable-length chunk in the primary storage layer as differentials between fixed-size and aligned blocks.

13. The computer program product of claim 12, wherein the computer-executable instructions further cause the apparatus to generate a reference to the existing chunk of data for the secondary storage layer of a backup system.

14. A system for variable length deduplication, and comprising:
    a secondary storage layer configured to store metadata representing a data structure of an object to be backed up; and
    a primary storage layer configured to:
        receive an indication of a location of an existing chunk of data in the primary storage layer when the existing chunk exists in the primary storage layer;
        store, in a standard format for direct access, fixed-length aligned blocks of data representing a variable-length chunk of variable-length chunks based on the object;
        compress the variable-length chunk based on the existing chunk that exists in the primary storage layer, wherein compressing the variable-length chunk comprises differentially compressing a difference between the variable length chunk and the existing chunk of data; and
        provide an application with the direct access to the set of data from the primary storage layer without using another system to provide the set of data to the application.

15. The system of claim 14, wherein the primary storage layer is further configured to perform deduplication of the variable length chunk or part of the variable length chunk in response to receiving the indication of the location of the existing chunk of data.

16. The system of claim 14, wherein the primary storage layer is further configured to store the variable length chunk in at least one fixed-size and aligned block, and wherein the existing chunk of data comprises at least one fixed-size and aligned block.

17. The system of claim 14, wherein the primary storage layer is further configured to perform inline differential compression of a data stream representing the object.

18. The system of claim 14, wherein the primary storage layer is further configured to restore, execute or expose the object.

19. The system of claim 14, wherein the primary storage layer is further configured to store the variable length chunk as differentials between fixed-size and aligned blocks.

20. The system of claim 14, wherein the primary storage layer is further configured to compress the variable length chunk.

* * * * *